US011126375B2

(12) United States Patent
Zhu et al.

(10) Patent No.: US 11,126,375 B2
(45) Date of Patent: Sep. 21, 2021

(54) ARBITER CIRCUIT FOR COMMANDS FROM MULTIPLE PHYSICAL FUNCTIONS IN A MEMORY SUB-SYSTEM

(71) Applicant: Micron Technology, Inc., Boise, ID (US)

(72) Inventors: Jiangli Zhu, San Jose, CA (US); Ying Yu Kai, Mountain View, CA (US)

(73) Assignee: Micron Technology, Inc., Boise, ID (US)

( * ) Notice: Subject to any disclaimer, the term of this patent is extended or adjusted under 35 U.S.C. 154(b) by 123 days.

(21) Appl. No.: 16/515,699

(22) Filed: Jul. 18, 2019

(65) Prior Publication Data

US 2021/0019085 A1    Jan. 21, 2021

(51) Int. Cl.
*G06F 13/16* (2006.01)
*G06F 3/06* (2006.01)
*G06F 13/42* (2006.01)

(52) U.S. Cl.
CPC .......... *G06F 3/0659* (2013.01); *G06F 3/0604* (2013.01); *G06F 3/0673* (2013.01); *G06F 13/1668* (2013.01); *G06F 13/4282* (2013.01); *G06F 2213/0026* (2013.01)

(58) Field of Classification Search
CPC ............... G06F 13/1642; G06F 13/362; G06F 13/0679; G06F 13/1668; G06F 13/4282; G06F 3/0659; G06F 3/0604; G06F 3/0673
See application file for complete search history.

(56) References Cited

U.S. PATENT DOCUMENTS

| | | |
|---|---|---|
| 2016/0034415 A1 | 2/2016 | Singh et al. |
| 2016/0188510 A1* | 6/2016 | Singh .................... G06F 13/362 710/105 |
| 2018/0217951 A1* | 8/2018 | Benisty ............... G06F 13/1642 |
| 2018/0232178 A1* | 8/2018 | Iwaki .................... G06F 3/0679 |
| 2018/0285024 A1 | 10/2018 | Coleman et al. |
| 2018/0285073 A1 | 10/2018 | Fukuchi |
| 2018/0307533 A1 | 10/2018 | Tian et al. |

OTHER PUBLICATIONS

PCT International Search Report and Written Opinion for International Application No. PCT/US2020/042659, dated Oct. 30, 2020, 11 pages.

* cited by examiner

*Primary Examiner* — Ryan Bertram
*Assistant Examiner* — Trang K Ta
(74) *Attorney, Agent, or Firm* — Lowenstein Sandler LLP

(57) ABSTRACT

A system controller of a memory system can present multiple physical functions (PFs) to a host computing system. The system controller can store commands from the host in separate queues and uses an arbiter circuit to issue commands. The arbiter can determine a difference value between a quota of commands and a count of commands issued from a respective queue. The quota is derived from a share specified by the host for the respective PF. The arbiter circuit determines a subset of queues by excluding queues that are empty and queues having a negative difference value. The arbiter circuit can randomly choose a selected queue from the subset and issue a command from the selected queue.

17 Claims, 9 Drawing Sheets

ARBITER CIRCUIT FOR COMMANDS FROM MULTIPLE PHYSICAL FUNCTIONS IN A MEMORY SUB-SYSTEM

TECHNICAL FIELD

Embodiments of the disclosure relate generally to memory sub-systems, and more specifically, relate to arbiter circuit for commands from multiple physical functions (PFs) in a memory sub-system.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
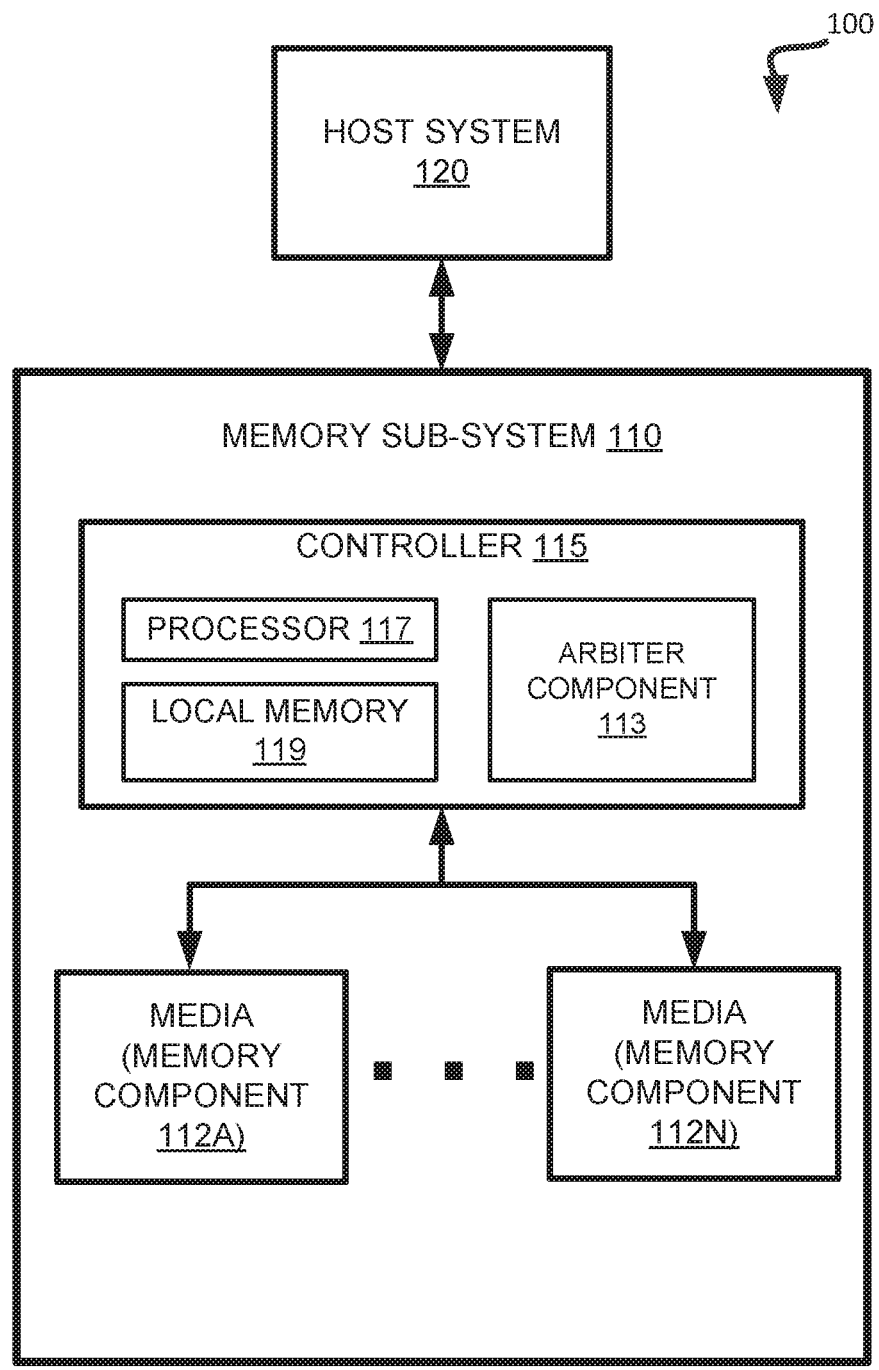
FIG. 1 illustrates an example computing environment that includes a memory sub-system in accordance with some embodiments of the present disclosure.

Aspects of the present disclosure are directed to use of an arbiter circuit for commands from multiple PFs in a memory sub-system. An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system can be a hybrid memory/storage sub-system. In general, a host system can utilize a memory sub-system that includes one or more memory components. The host system can provide data to be stored at the memory sub-system and can request data to be retrieved from the memory sub-system.

The memory sub-system can include multiple memory components that can store data from the host system. In some systems, the memory sub-system presents itself to the host system as a single physical function over a peripheral component interconnect express (PCIe) interface. Certain conventional memory sub-systems utilize the single root input/output virtualization (SR-IOV) specification. SR-IOV is a specification that allows the isolation of PCIe resources among various hardware functions for manageability and performance reasons, while also allowing single physical PCIe devices to be shared in a virtual environment. SR-IOV offers different virtual functions to different virtual components (e.g., a network adapter) on a physical server machine. SR-IOV also allows different virtual machines in a virtual environment to share a single PCIe hardware interface. A physical function allows enumeration of a number of virtual functions and a hypervisor can then assign those virtual functions to one or more virtual machines. This solution requires two sets of drivers, including a physical function driver to enumerate the virtual functions, and the kernel needs to support a complete SR-IOV capable stack, and then the virtual functions require another driver that only can run the virtual functions. These conventional memory sub-systems do not present multiple physical functions over the PCIe interface to the host system.

Aspects of the present disclosure address the above and other deficiencies by having a memory sub-system that uses multiple physical functions, multiple corresponding queues, and an arbiter component to arbitrate commands from the multiple queues. Aspects of the present disclosure provide adaptability by allowing a runtime workload to adjust through periodically updating arbitration parameters, such as a percentage share, based on statistics. The host system can specify the number of physical functions to be used and the respective percentage shares for each of the number of physical functions. Aspects of the present disclosure provide fairness in the arbitration by serving commands according to their share percentage as specified by the host system. Aspects of the present disclosure provide opportunistic arbitration by making full use of bandwidth when some physical functions are idle (e.g., corresponding queue is empty of commands). Aspects of the present disclosure provide scattered arbitration by distributing commands of the physical functions into timing windows, attempting to prevent command cluster of a single physical function. In this way, a worst case latency can be improved.

Advantages of the present disclosure include, but are not limited to, improved performance by taking advantage of the entire bandwidth between the host system and the memory sub-system and by distributing commands into timing windows, improved latency, and improved adaptability by allowing the runtime workload to periodically adjust based on statistics. Also, by permitting the host system to specify the corresponding shares of the multiple physical functions, the aspects of the present disclosure allow the arbitration to be fair among the multiple physical functions. Additionally, the quality of service and performance of the memory sub-system can be improved by using the outstanding command queues and the arbiter component to arbitrate the processing of the commands in the outstanding command queues. Additional details of the arbiter component are provided below with respect to FIGS. 1-8.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes an arbiter component 113 that can arbitrate commands received from the host system 120. In some embodiments, the controller 115 includes at least a portion of the arbiter component 113. For example, the controller 115 can include a processor 117 (processing device) configured to execute instructions stored in local memory 119 for performing the operations described herein. In some embodiments, some of the functionality of the arbiter component 113 can be implemented as part of the processor 117, as part of firmware on the controller 115, as part of an application or an operating system executing on the processor 117. Alternatively, some of the functionality of the arbiter component 113 can be implemented as part of the host system 120.

The arbiter component 113 can use outstanding command queues to store commands (e.g., read requests and write requests) to prevent data hazards and enhance the quality of service of accessing data in the memory sub-system. The outstanding command queues can improve request traffic throughput based on different types of traffic in memory sub-systems. The controller 115 can use the arbiter component 113 to arbitrate which commands from which queues are selected for processing by the controller 115. The arbiter component 113 can include control logic and the outstanding command queues to provide in-order accesses for data requested and potentially out-of-order accesses to data requested. In some embodiments, the arbiter component 113 can receive preload instructions from one or more applications executing on the host system 120 to improve quality of service.

In some embodiments, to further improve performance and quality of service of the memory sub-system, the arbiter component 113 can determine a schedule of when to execute requests and fill operations based on when the requests are received and according to an arbitration scheme, as described herein.

In some embodiments, to further improve performance and quality of service of the memory sub-system, the arbiter component 113 can determine a difference value between a quota of commands and a count of commands processed by the controller 115 from one of multiple queues, where each queue is associated with one of multiple PFs. The quota of commands for each of the multiple queues can be based on, or derived from, on a share for the respective PF, the share being specified by the host system 120. The arbiter component 113 can determine whether the respective queue is empty of commands. That is the respective queue does not store an outstanding command at the time of arbitration. The arbiter component 113 can determine that the queue is empty using an empty indicator from the queue itself Alternatively, the arbiter component 113 can determine the empty state of the queue using other techniques. The arbiter component 113 can determine a subset of the multiple queues by excluding queues that are empty of commands and by excluding queues having a negative number for the respective difference value. That is the subset does not include queues that are empty or have a corresponding negative difference value as determined above. This results in full utilization of the bandwidth by not selecting PFs that do not have any outstanding queues (or are otherwise idle) and prioritizes queues that have not met their respective quotas. The arbiter component 113 can randomly choose a selected queue from the subset and process a command from the selected queue, such as by issuing a command to the processor to process the command from the selected queue. Additional details of the arbiter component 113 are described below.

Figure 2:
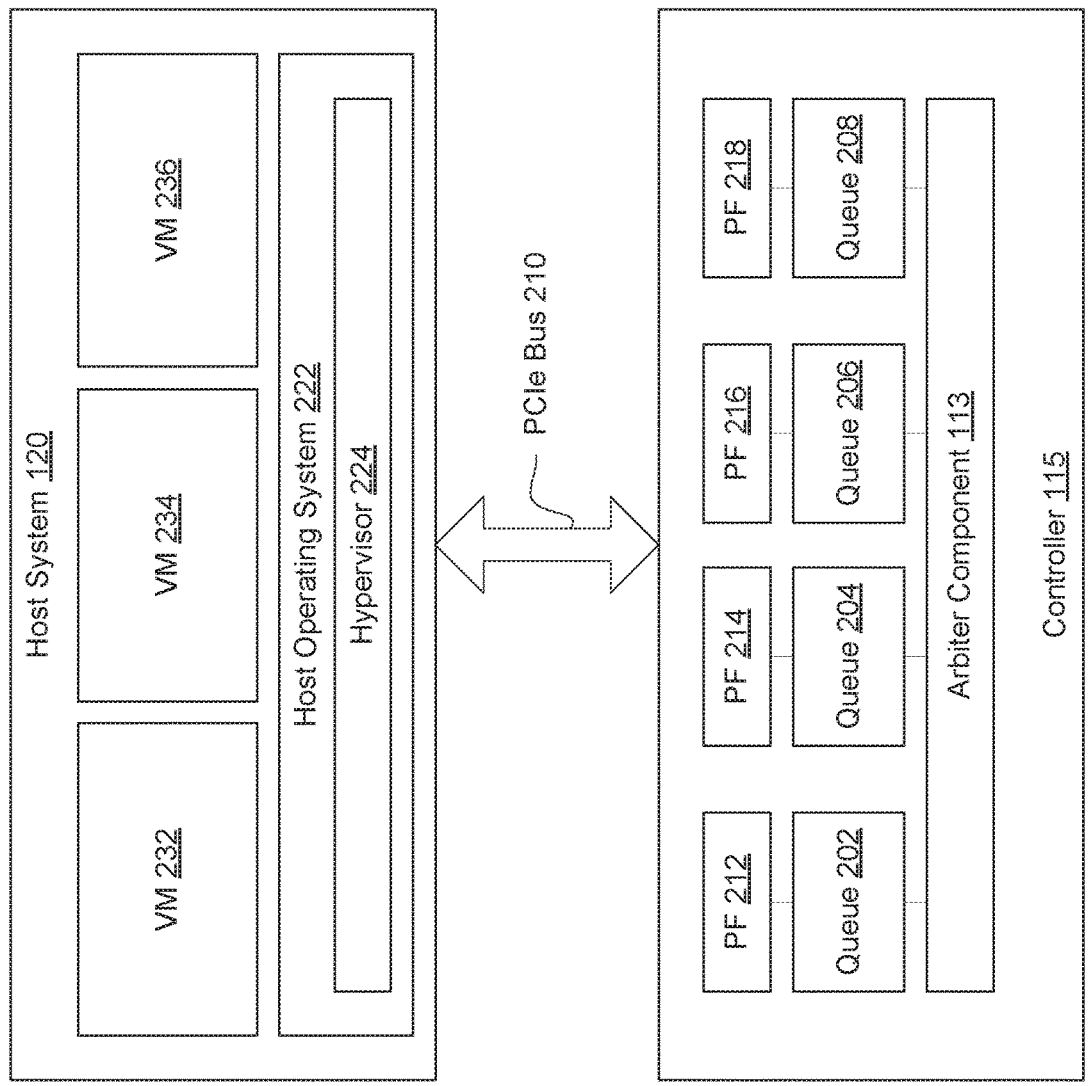
FIG. 2 illustrates an example physical host interface between a host system and a memory sub-system implementing an arbiter component in accordance with some embodiments of the present disclosure.

FIG. 2 illustrates an example physical host interface between a host system 120 and a memory sub-system implementing an arbiter component 113 in accordance with some embodiments of the present disclosure. In one embodiment, the controller 115 of memory sub-system 110 is connected to host system 120 over a physical host interface, such as PCIe bus 210. In one embodiment, the arbiter component 113, which can be implemented as part of the controller 115 or as a separate circuit from the controller 115. The controller 115 manages a number of queues 202-208 within the controller 115 and a number of physical functions (PFs) 212-218. Each physical function 212-218 is a PCI function that supports the SR-IOV capabilities as defined by the SR-IOV specification. Physical functions 212-218 are fully featured PCIe functions that can be discovered, managed, and manipulated like any other PCIe device, and thus can be used to configure and control a PCIe device (e.g., queues 202-208). Each physical function 212-218 can have some number virtual functions associated with therewith. It should be noted that the controller 115 can also manage virtual functions, virtual controllers, or the like to present themselves as physical functions and physical controller to other devices, such as host system 120, connected to PCIe bus 210 by virtue of the physical function 212-218 associated with each queue 202-208. The virtual functions can be lightweight PCIe functions that share one or more resources with the physical function and with virtual functions that are associated with that physical function. For example, after SR-IOV is enabled in the physical function, the PCI configuration space of each virtual function can be accessed by a bus, device, and function (BDF) number of the physical function. Each virtual function can have a PCI memory space, which is used to map its register set. The virtual function device drivers operate on a register set to enable its functionality and the virtual function appears as an actual PCIe device, accessible by host system 120 over PCIe bus 210.

It should be noted that although FIG. 2 illustrates four queue 202-208 and four corresponding physical functions 212-218, in other embodiments, there may be any other number of queue 202-208, each having a corresponding physical function. Each of queue 202-208 stores commands for corresponding applications on the host system 120 in connection with storage access operations for the corresponding portion of the underlying memory components 112A to 112N, with which it is associated. For example, queue 208 can receive a command (e.g., data access requests) from host system 120 over PCIe bus 210 via PF 218, including requests to read, write, or erase data in a first portion of memory component 112A. The arbiter component 113 can arbitrate between other commands stored in the other queues 202-206, and when the command in the queue 208 of PF 218 is selected, the arbiter component 113 can issue the command to the controller 115 to perform the requested memory access operation on the data stored at an identified address in the first portion and return requested data and/or a confirmation or error message to the host system 120, as appropriate. The arbiter component 113 can function in the same or similar fashion with respect to data access requests from other queues 202-206. As described above, arbiter component 113 associates one of physical functions 212-218 with each of queues 202-208 in order to allow the underlying memory components 112A to 112N to appear as separate storage devices on the PCIe bus 210.

Furthermore, each physical function 212-218 may be implemented in either a privileged mode or normal mode. When implemented in the privileged mode, the physical function has a single point of management that can control resource manipulation and storage provisioning for other functions implemented in the normal mode. In addition, a physical function in the privileged mode can perform management options, including for example, enabling/disabling of multiple physical functions, storage and quality of service (QoS) provisioning, firmware and controller updates, vendor unique statistics and events, diagnostics, secure erase/encryption, among others.

In some embodiments, the host system 120 can run multiple virtual machines 232, 234, 236, by executing a software layer 224, often referred to as "hypervisor," above the hardware and below the virtual machines, as schematically shown in FIG. 2. In one illustrative example, the hypervisor 224 may be a component of a host operating system 222 executed by the host system 120. Alternatively, the hypervisor 224 may be provided by an application running under the host operating system 222, or may run directly on the host system 120 without an operating system beneath it. The hypervisor 224 may abstract the physical layer, including processors, memory, and I/O devices, and present this abstraction to virtual machines 232, 234, 236 as virtual devices, including virtual processors, virtual memory, and virtual I/O devices. Virtual machines 232, 234, 236 may each execute a guest operating system which may utilize the underlying virtual devices, which may, for example, map to a portion of the memory components 112A to 112N managed by one of queues 202-208 and arbiter component 113 in memory sub-system 110. One or more applications may be running on each virtual machine under the guest operating system.

Each virtual machine 232, 234, 236 may include one or more virtual processors. Processor virtualization may be implemented by the hypervisor 224 scheduling time slots on one or more physical processors such that from the guest operating system's perspective, those time slots are scheduled on a virtual processor. Memory virtualization may be implemented by a page table (PT) which is a memory structure translating virtual memory addresses to physical memory addresses. The hypervisor 224 may run at a higher privilege level than the guest operating systems, and the latter may run at a higher privilege level than the guest applications.

In one implementation, there may be multiple partitions on host system 120 representing virtual machines 232, 234, 236. A parent partition corresponding to virtual machine 232 is the root partition (i.e., root ring 0) that has additional privileges to control the life cycle of other child partitions (i.e., conventional ring 0), corresponding, for example, to virtual machines 234 and 236. Each partition has corresponding virtual memory, and instead of presenting a virtual device, the child partitions see a physical device being assigned to them. When host system 120 initially boots up, the parent partition can see all of the physical devices and, via a pass through mechanism (e.g., PCIe Pass-Through or Direct Device Assignment), the parent partition can assign an NVME device to the child partitions. The physical functions 212-218 and the associated queues 202-208 may appear as a separate physical storage resource to each of virtual machines 232, 234, 236, which the guest operating system or guest applications running therein can access. In one embodiment, for example, virtual machine 232 is associated with physical function 212, virtual machine 234 is associated with physical function 214, and virtual machine 236 is associated with physical function 216. In other embodiments, one virtual machine may be associated with two or more physical functions, and/or two or more virtual machines may be associated with one physical function. The virtual machines 232, 234, 236, can identify the associated physical function using a corresponding bus, device, and function (BDF) number.

Figure 3:
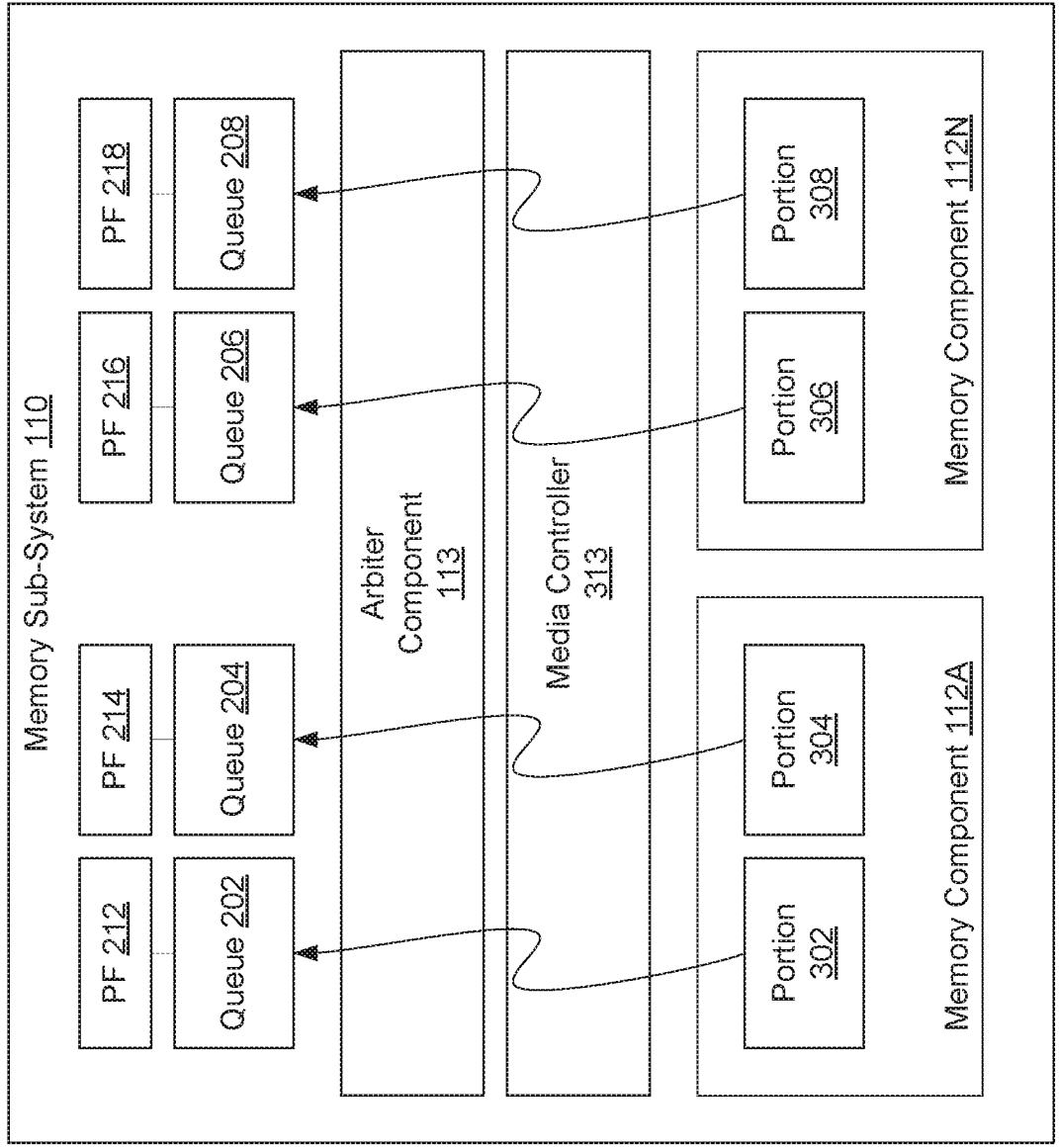
FIG. 3 illustrates multiple queues, an arbiter component and a single media controller in a memory sub-system in accordance with some embodiments of the present disclosure.

FIG. 3 illustrates multiple queues 202-208, an arbiter component 113 and a single media controller 313 in a memory sub-system in accordance with some embodiments of the present disclosure. As described above, the media controller 313 can map each PF 212-218 in the memory sub-system 110 to a corresponding portion of one of memory components 112A to 112N. As illustrated in FIG. 3, physical function 212 is mapped to portion 302 of memory component 112A, physical function 214 is mapped to portion 304 of memory component 112A, physical function 216 is mapped to portion 306 of memory component 112N, and physical function 218 is mapped to portion 308 of memory component 112N. In some embodiments, one physical function can be mapped to multiple memory components and can take a partition in each memory component. For example, the physical function 212 (PF0) can be mapped to the portion 302 (portion0) of memory component 112A, the portion 306 of memory component 112N, and so forth. It should be noted that the mapping between physical functions 212-218 can change over time. In other embodiments, the respective portions may span two or more of memory components 112A to 112N. Each portion 302-308 may have a fixed size or may have a different size. For example, portion 302 could be larger than portion 304, which may be larger than portion 306, which may be the same size as portion 308. In one embodiment, each portion 302-308 is represented by a unique namespace. The namespace is a quantity of one or more memory components 112A to 112N that can be formatted into logical blocks when memory components are configured with the NVMe protocol. The NVMe protocol provides access to the namespace, which appears as a standard-block device on which file systems and applications can be deployed without any modification. Each of physical functions 212-218 can have one or more separate namespaces, each identified by a unique namespace ID (NSID). In addition, there may be one or more shared namespaces, comprising multiple portions 302-308 that are accessible by two or more of the physical functions 212-218.

In addition, to having a portion 302-308 of memory assigned, each physical function 212-218 may also have an associated number of queue pairs. The memory sub-system 110 may have a fixed number of input/output (I/O) queue pairs and admin queue pairs which can be distributed among queues 202-208. The I/O queue pairs are used to receive memory access requests (or data commands) from host system 120 and the admin queue pairs are used to receive administrative commands. The number of I/O queue pairs assigned to each physical function 212-218 controls how many concurrent memory access requests can be received at the corresponding memory sub-system 110. For example, if media controller 312 assigned ten I/O queue pairs, the memory sub-system 110 can receive up to ten memory access requests from host system 120 before a subsequent request is denied. The memory access requests are held in the associated I/O queue pairs while a current request is being processed. Once the media controller 313 has completed processing of the current request, a next request can be retrieved from the associated I/O queue pairs for processing, and another memory access request can be added to the queue.

Although not illustrated in FIG. 3, the memory sub-system 110 can include local memory to implement the queues 202-208, as well as other memory for operations performed by the media controller 313 or other components of the memory sub-system 110. This local memory is separate from the memory components 112A-112N. The local memory can be DRAM, SRAM, or other types of technology, whereas the memory components 112A-112N can be flash memory or other types of nonvolatile memory. The outstanding command queues 202-208 can be first-in, first-out (FIFO) queues.

The arbiter component 113 can include arbitration logic circuits, hardware state machines, or the like, that determine an order in which the requests and/or fill operations are to be processed by the media controller 312. The arbitration logic circuit can specify scheduling requests and/or fill operations in the order in which the operations are received. One purpose of the arbitration logic circuit can be to permit the host system 120 to define an appropriate share to govern how the commands in the queues should be arbitrated in a dynamic fashion. Additional functionality of the arbiter component 113 is discussed below.

Figure 4A:
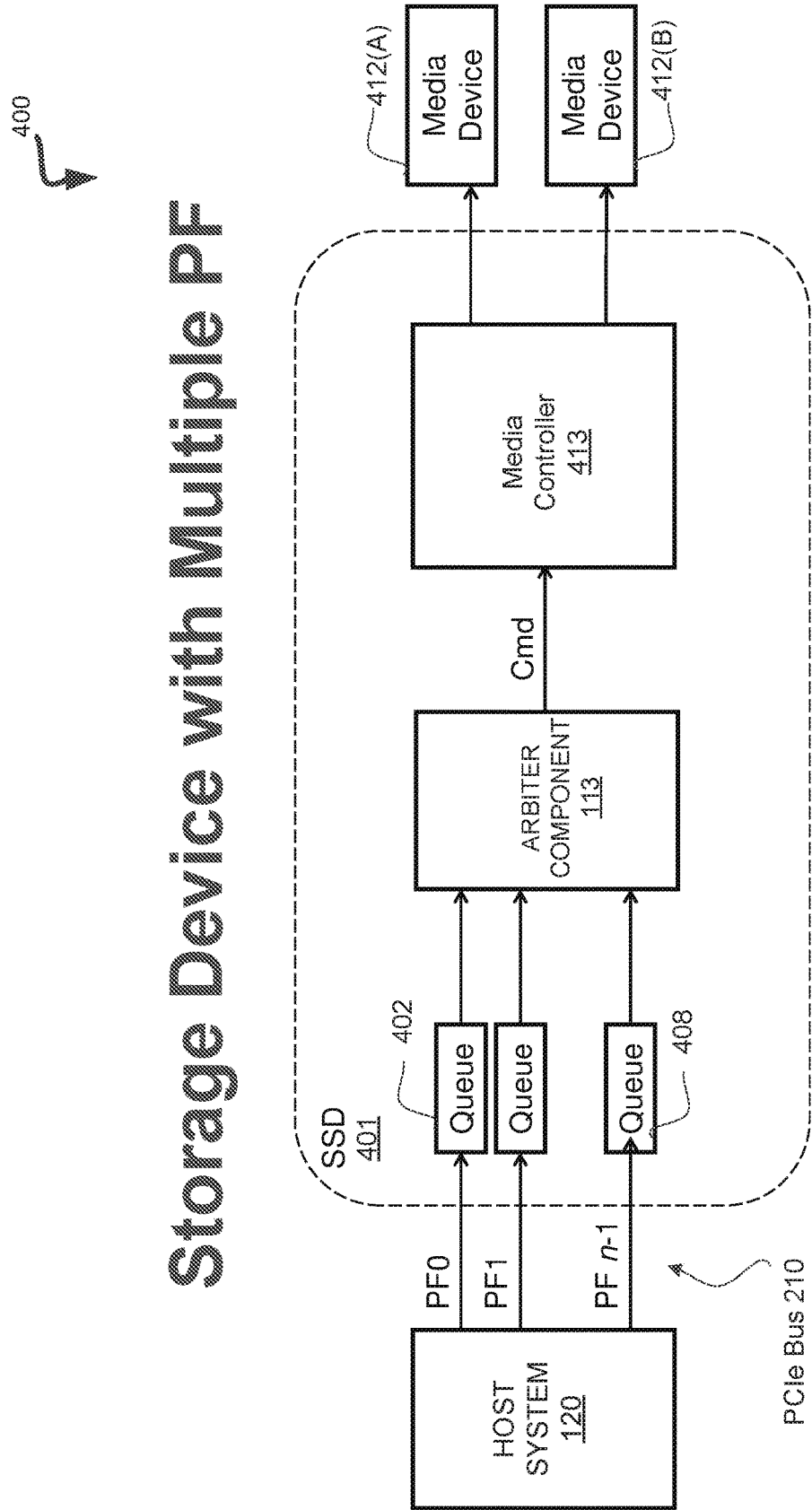
FIG. 4A illustrates multiple queues, an arbiter component and a single media controller in a memory sub-system in accordance with some embodiments of the present disclosure.

FIG. 4A illustrates multiple queues, an arbiter component and a single media controller in a memory sub-system in accordance with some embodiments of the present disclosure. The memory system 400 includes one or more memory devices 412, such as illustrated by the two memory devices 412A and 412B. The memory system 400 also includes a system controller 401 (SSD controller) that is operatively coupled with the memory devices 412A and 412B. The system controller 401 includes a media controller 413, an arbiter component 113 (e.g., an arbiter circuit), and multiple queues 402-408. Each of the queues 402-408 is associated with a physical function presented to a host computing system, host system 120, over an interconnect, such as a PCIe interface. The system controller 401 can present two or more physical functions (PFs) to the host system 120 over the PCIe interface. The host system 120 can assign each of the PFs to individual applications, virtual machines, or the like. The host system 120 can request the number of PFs needed and the system controller 401 can assign or otherwise associate one of the queues 402-408 to each of the various PFs. In some embodiments, each of the PFs corresponds to a virtual memory controller that is associated with a different portion of the memory devices 412A and 412B.

During operation, the arbiter component 113 (arbiter circuit) can determine a difference value between a quota of commands and a count of commands issued to the media controller 413 from the respective queue (402-408). For example, the arbiter component 113 can generate a vector, a list, or other data structure with a different value for each of the PFs. For example, the data structure can include a first element in the list corresponds to a first PF (PF0), a second element in the list corresponds to a second PF (PF1), and so forth up to the $n^{th}$ PF (PFn-1). As described herein, the arbiter component 113 can determine the quota of commands for each of the PFs based on a share (e.g., allocation or percentage of commands) for the respective PF, the share being specified by the host system 120. For example, if there are four PFs, the host system 120 can assign 10% share to a first PF, 20% share to a second PF, 30% share to a third PF, and 40% share to a fourth PF. Alternatively, other shares can be specified for two or more PFs. Assume PF 0~PF n-1, the following equation (1) shows how the shares can be specified by the host system 120.

$$\{p0, p1, \ldots, pn-1\}=\{10\%, 20\%, 30\%, 40\%\}$$

The arbiter component 113 can determine, for each of the PFs, whether the respective queue is empty of commands. For example, the queue can include a bit to indicate that it is empty. Alternatively, the arbiter component 113 can determine the empty status using other mechanisms or techniques. The arbiter component 113 can determine a subset of queues from the queues 402-408 for arbitration by excluding queues that are empty of commands and queues having a negative number for the respective difference value. That is, the arbiter component 113 can remove the corresponding PFs from the data structure when the PF is empty. Similarly, the arbiter component 113 can remove the corresponding PFs with negative difference values.

Once the arbiter component 113 has determine the subset of queues, the arbiter component 113 can randomly choose a selected queue from the subset issue a command to the media controller 413 from the selected queue. Once a queue is selected, the arbiter component 113 can update the count for the respective queue. For example, the arbiter component 113 can update a counter associated with the selected queue.

In a further embodiment, the arbiter component 113 can store a number (s) of available command slots in a timing window. For example, the number of available command slots could be 100. For each of the PFs, the arbiter component 113 can determine the respective quota of commands based on the respective share specified by the host system 120 and the number (s) of available command slots. Continuing with the example above with four PFs, the quota for the first PF is 10, the quota for the second PF is 20, the quota for the third PF is 30, and the quota for the fourth PF is 40. The quota can be expressed in the following equation (2).

$$q=s*p$$

where p is the corresponding share. The quotas for the list of PFs can be expressed in equation (3).

$$\{q0, q1, \ldots, qn-1\}=s*\{p0, p1, \ldots, pn-1\}=\{10, 20, 30, 40\}$$

where q is the corresponding quota for the PF.

In some embodiment, the arbiter component 113 includes multiple counters, such as one counter per PF. Alternatively, the arbiter component 113 include multiple counter with multiple sub-counters per PF, such as to create a dynamic counter, as described below with respect to FIG. 6. In one embodiment, each counter is associated with one of the queues 202-208. The arbiter component 113 tracks the count of commands issued from the respective queue by incrementing the respective counter when a command is issued to the media controller 413 from the respective queue. In another embodiment, each of the queues 202-208 is associated with multiple sub-counters, where a number of the sub-counters corresponds to a number of sub-windows of a timing window. For example, there can be four sub-windows in a timing window having a number of available command slots. Where a timing window has 100 available command slots (e.g., s=100), each sub-window has 25 available command slots. The counts (or counters) for the list of PFs can be expressed in equation (4).

$$\{c0, c1, \ldots, cn-1\}=\{15, 18, 25, 30\}$$

where c is the counter for each PF port.

In one embodiment, the arbiter component 113 can randomly choose the selected queue from the subset by: calculating a sum of the difference value of each of the queues in the subset; assigning a proportional number of index values to each of the queues in the subset based on a ratio of the respective difference value and the sum; and randomly select an index value between one and the value of the sum, the index value specifying a selection of the selected queue from the subset. For example, the arbiter component 113 can implement an arbitration algorithm to always choose a PF for each available command slot in the timing window as follows:

Compute a difference vector: $\{q_0-c_0, \ldots q_{n-1}-c_{n-1}\}=\{-5, +2, +5, +10\}$ Pre-process a subset by:
  Removing PFs with empty cmds in the queue from the subset of candidate PFs (e.g., PF2 may not have any commands in its corresponding queue);
  If there is at least one positive PF, removing PFs with negative difference values (q–c) (e.g., PF0 because it is –5).
  Only arbitrate among the subset (e.g., {PF1, PF3}) by a weighted round-robin selection process set forth below;
  Else if there are no positive PFs, arbitrate among the subset that includes the negative difference values.

Weighted Round-robin selection process:
Randomly choose the selected queue by:
  Summing the difference values of those in the subset (e.g., PF1+PF3=12);
  Randomly select a number between 1 and the sum (e.g., choose from 1~12) to select a PF;
  Update this PF's counter.

In other embodiments, the arbiter component 113 can randomly choose the selected queue from the subset by using a weighted round-robin selection scheme or process. For example, the arbiter component 113 can randomly choose a selected PF from the subset of candidate PFs using a weighted round-robin process in which a number between one and a sum of the difference values is selected to choose the selected PF from the subset of candidate PFs. Alternatively, other selection schemes can be performed to arbitrate from the subset of queues in a random manner or a pseudo random manner. In one embodiment, the arbiter component 113 can determine, after excluding queues that are empty of commands and queues having the negative number for the respective difference value, that there are no remaining queues in the subset of queues. In this case, the arbiter component 113 can determine a second subset of queues by excluding only queues that are empty of commands. In essence, the second subset of queues will include the queues having the negative difference values.

In the following example, there are four PFs with the following shares and corresponding quotas, assuming a timing window (s) of 100:

$\{p0, p1, \ldots, pn-1\}=\{10\%, 20\%, 30\%, 40\%\}$ $\{q0, q1, \ldots, qn-1\}=s*\{p0, p1, \ldots, pn-1\}=\{10, 20, 30, 40\}$ Assuming all four PFs have commands, the arbitration results may be as follows:
PFs: {99, 200, 320, 381}
An example of the selected PF of every cycle is shown as follows:
[2, 3, 3, 1, 3, 0, 2, 3, 3, 3, 3, 3, 1, 2, 1, 2, 0, 3, 3, 1, 3, 2, 1, 0, 1, 2, 1, 1, 3, 3, 0, 2, 0, 2, 2, 0, 3, 3, 1, 2, 3, 3, 1, 2, 1, 2, 2, 3, 3, 3, 2, 3, 0, 3, 3, 2, 2, 3, 3, 2, 3, 1, 0, 1, 0, 3, 3, 1, 3, 2, 1, 2, 2, 2, 3, 3, 1, 2, 3, 2, 2, 1, 2, 2, 3, 3, 3, 3, 3, 2, 2, 1, 3, 3, 3, 2, 2, 0, 1, 3, 1, 0, 1, 2, 3, 2, 3, 3, 2, 2, 0, 2, 1, 2, 3, 2, 1, 2, 2, 2, 2, 3, 1, 3, 3, 3, 2, 2, 3, 1, 3, 2, 3, 2, 0, 3, 1, 0, 2, 3, . . . ]

In another embodiment, a memory system including one or more memory devices and a system controller, operatively coupled with the one or more memory devices, presents multiple PFs to a host computing system over an interconnect. Each of the PFs being is with a queue to store commands from the host computing system. For each of the PFs, the system controller determines a quota of commands based on a respective share percentage for the respective PF, the share being specified by the host computing system. The system controller tracks a current count of commands issued from the respective queue and determines a difference value between the quota and the current count. The system controller generates a subset of candidate PFs for selection of a command from the respective queue by removing any of the PFs where the respective queue does not store a command from the host computing system and by removing any of the PFs where the difference value is less than zero. The system controller randomly chooses a selected PF from the subset of candidate PFs using a weighted round-robin selection process in which a number between one and a sum of the difference values in the subset is randomly selected to choose the selected PF from the subset of candidate PFs. The system controller processes a command from the queue corresponding to the selected PF and the system controller update the count of the selected PF's counter.

In some embodiments, the system controller receives the share percentage from the host computing system for each of the PFs. Alternatively, the system controller receives control information from the host computing system using one of the PFs or using a sideband communication channel.

In one embodiment, the system controller includes a single media controller, multiple queues, where each queue is associated with one of the f PFs, and an arbiter circuit coupled to the queues and the single media controller. The arbiter circuit, for each of the PFs, determines the quota of commands based on the respective share percentage for the respective PF, the share percentage being specified by the host computing system; tracks the current count of commands issued from the respective queue, and determines the difference value between the quota and the current count. In a further embodiment, the arbiter circuit generates the subset of candidate PFs and randomly chooses the selected PF from the subset of candidate PFs using the weighted round-robin selection process. Once selected, the arbiter circuit issues, schedules, or otherwise causes the command from the corresponding queue to be processed. For example, the arbiter circuit issues the command from the queue, corresponding to the selected PF, to the media controller.

In a further embodiment, the arbiter circuit stores a number of available command slots in a timing window. For each of the PFs, the arbiter circuit determines the respective quota of commands based on the respective share specified by the host computing system and the number of available command slots. In another embodiment, the arbiter circuit includes multiple counters, such as one counter per queue (or per PF). The arbiter circuit tracks the count of commands issued from the respective queue by incrementing the respective counter when a command is issued to the media controller from the respective queue. Alternatively, the arbiter circuit includes multiple sub-counters for each counter per queue. In one embodiment, the number of the sub-counters corresponds to a number of sub-windows in a timing window having a number of available command slots.

In another embodiment, the arbiter circuit randomly chooses the selected queue from the subset by calculating a sum of the difference value of each of the queues in the subset; assigning a proportional number of index values to each of the queues in the subset based on a ratio of the respective difference value and the sum; and randomly selecting an index value between one and the sum to select the selected queue from the subset.

In one embodiment, the timing window can be used by the arbiter circuit to define a static data structure corresponding to the PF quotas and dynamic counters as set forth in the data structures below. Using the static data structures and dynamic data structure, the arbiter circuit can implement the algorithm as set for the below:

Data Structure
Static Data Structure: Timing Window=>PF Quotas:
Total available command slots: s=100
Assume PF 0~PF n−1,
$\{p_0, p_1, \ldots, p_{n-1}\}=\{10\%, 20\%, 30\%, 40\%\}$
Quotas:

$$\{q_0, q_1, \ldots, q_{n-1}\} = s * \{p_0, p_1, \ldots, p_{n-1}\} = \{10, 20, 30, 40\}$$

Dynamic Data Structures:
Counters of each PF port:
$\{c_0, c_1, \ldots, c_{n-1}\}=\{15, 18, 25, 30\}$
Algorithm—Arbitration (Always choose a PF):
Diff:
$\{p_0-c_0, \ldots p_{n-1}-c_{n-1}\}=\{-5, +2, +5, +10\}$
Pre-process:
Remove PF with empty cmds in the queue, Say, PF2
If there is positive PFs,
Remove PF with negative q−c, PF0
Only arbitrate among {PF1, PF3}
Else serving negative PFs with outstanding cmds, PF0
Randomly choose:
PF1+PF3=12
Toss a coin to choose from 1~12=>Then select a PF
Update this PF's counter As described herein, the arbiter component 113 can be implemented in hardware as an arbiter circuit implementation illustrated described below with respect to FIG. 4B.

Figure 4B:
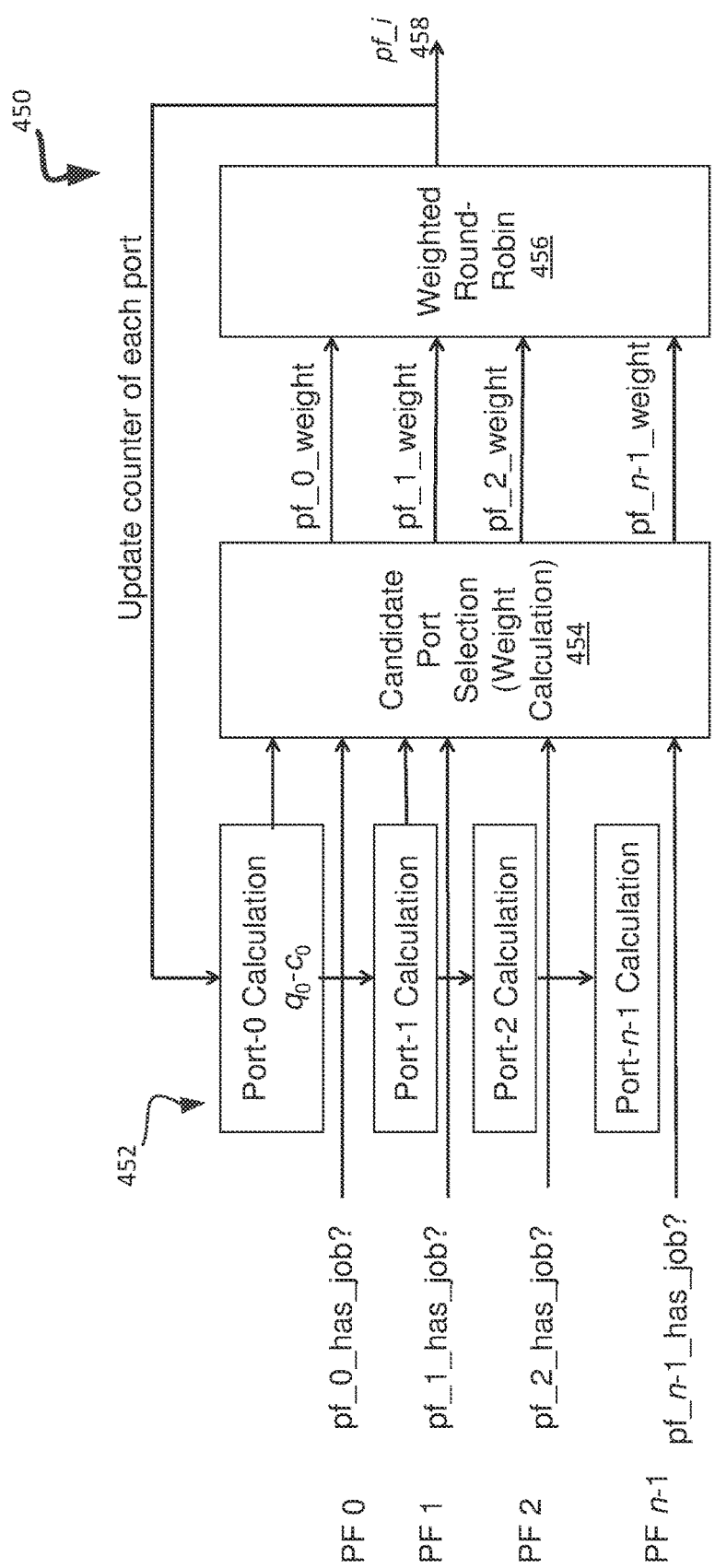
FIG. 4B illustrates a block diagram of an arbiter circuit in accordance with some embodiments of the present disclosure.

FIG. 4B illustrates a block diagram of an arbiter circuit 450 in accordance with some embodiments of the present disclosure. The arbiter circuit 450 includes a difference calculation block 452 for each of the n ports, each corresponding to one of the n PFs. Each difference calculation block 452 computes a difference between the quota and the current count for a particular PF ($q_0-c_0$). The output of each difference calculation block 452 is input into a candidate port selection block 454 for weight calculation. In addition to the difference value input, the candidate port selection 454 receives an indication of whether the respective queue is empty of commands. For example, the candidate port selection block 454 can receive a signal to indicate that the particular port has a job (Pf_0_has_job?). As noted above, if the particular queue is empty of commands, the queue is not considered for arbitration (i.e., is not part of the subset). For the queues determined to be part of the subset, the candidate port selection 454 outputs corresponding weight values assigned to the particular PFs in the subset (PF_0_weight, PF_1_weight, etc). A weighted round-robin block 456 receives the weights from the particular PFs in the subset (that have commands) and selects one of the PFs and outputs a PF number 458 corresponding to the selected PF (e.g., PF # or pf_i). A job (e.g., a command) stored in the respective queue of the selected PF, as indicated by the PF number 458, is submitted to the media controller to be processed. The weighted round-robin block 456 also updates the count (c) of the respective difference calculation block 452, corresponding to the output PF number 458, to adjust further arbitration of the PFs. The arbiter circuit 450 can be one implementation of the arbiter component 113. Alternatively, other circuits can be used to arbitrate commands from the multiple queues.

In some embodiments, the arbiter circuit can operate according to the following three goals: 1) Fair: When all PFs have commands, serve according to their share; 2) Opportunistic: Make full use of bandwidth when some PFs are idle; and 3) Scattered: Distribute commands of PFs into the timing windows, try to prevent command cluster of a single PF. The commands can also be arbitrated using dynamic counters with a sliding window as described below with respect to FIG. 5.

Figure 5:
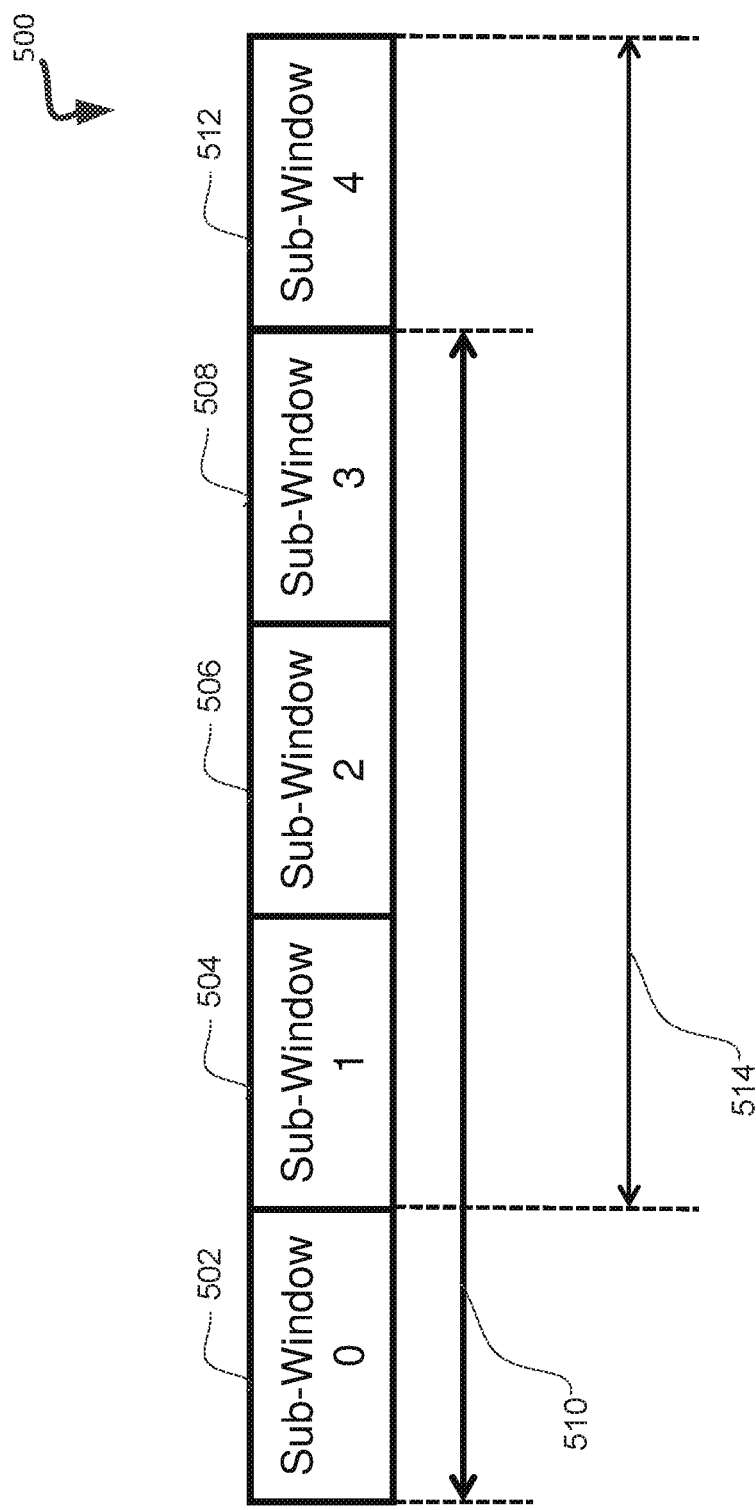
FIG. 5 illustrates a sliding window with multiple sub-counters of a dynamic counter of an arbiter component in a memory sub-system in accordance with some embodiments of the present disclosure.
Figure 6:
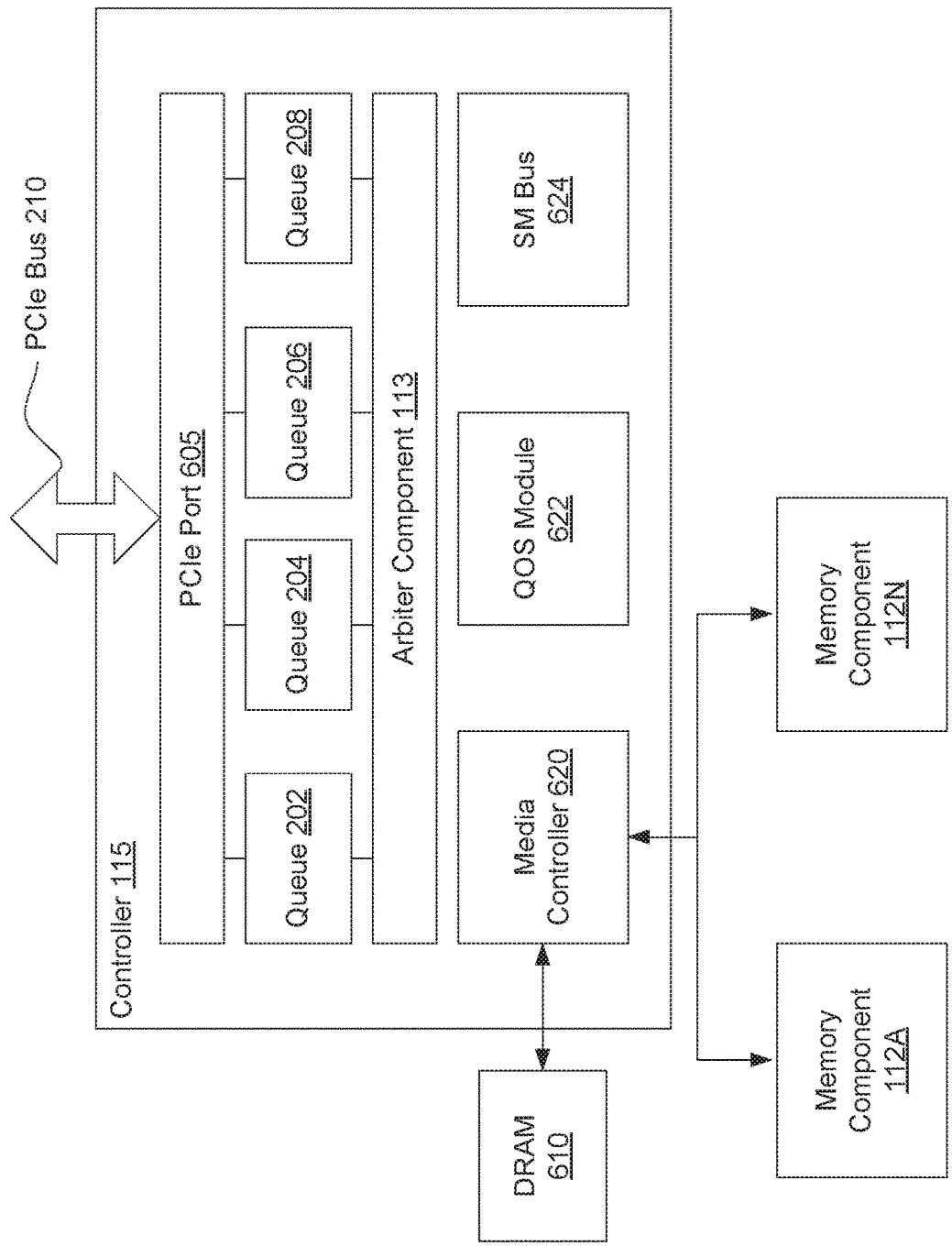
FIG. 6 illustrates a physical controller implementing an arbiter component in accordance with some embodiments of the present disclosure.

FIG. 5 illustrates a sliding window 500 with multiple sub-counters of a dynamic counter of an arbiter component in a memory sub-system in accordance with some embodiments of the present disclosure. As described herein, the arbiter component 113 can include a counter that tracks a current count of commands issued from a particular queue. As shown in FIG. 6, the counter can be a dynamic counter with multiple sub-counters for one queue. The number of sub-counters can correspond to a number of sub-windows in a timing window having a number of available command slots. As illustrated, a first timing window 510 includes four sub-windows 502-508. Four sub-counters can be used for the four sub-windows 502-508. A first sub-counter counts the number of commands issued from the respective queue during the first sub-window 502 (sub-window 0), a second sub-counter counts the number of commands issued from the respective queue during the second sub-window 504 (sub-window 1), a third sub-counter counts the number of commands issued from the respective queue during the third sub-window 506 (sub-window 2), and a fourth sub-counter counts the number of commands issued from the respective queue during the fourth sub-window 508 (sub-window 3). After the first timing window 510, the first sub-counter corresponding to the first sub-window 502, can be reset and can count the number of commands issued from the respective queue during the fifth sub-window 512 (sub-window 4). As a result, the dynamic counter only resets one of the sub-counters after each sub-window, avoiding the restart of the counters from scratch every timing window. That is, the timing window 510 becomes a sliding window. A second timing window 514 can be said to start after the first sub-window window 502 (sub-window 0) and go through the fifth sub-window 512 (sub-window 4). Similar, a third timing window would start after the second sub-window 504 (sub-window 1).

It should be noted that when computing the difference values, as described above, the arbiter component 113 uses the counts within the sliding window. That is, during the second timing window 514, the arbiter component 113 does not use the counts that occurred during the sub-window 502 (sub-window 0), as the corresponding sub-counter is reset and is not tracking counts during the fifth sub-window 512 (sub-window 4). The sliding window of the dynamic counters can produce smooth output from the arbiter components 113, as the attempting to meet the quotas for the respective queues within the sliding window.

FIG. 6 illustrates a physical controller implementing an arbiter component in accordance with some embodiments of the present disclosure. As described above, controller 115 includes arbiter component 113 and queues 202-208. Queues 202-208 are coupled to PCIe port 605 which enables communications with host system 120 across PCIe bus 210. In one embodiment, controller 115 further includes media controller 620. Media controller 620 manages operations of storage media in the memory sub-system 110 including memory components 112A to 112N and optionally volatile memory, such as one or more dynamic random access memory (DRAM) devices 610. When the queues 202-208 receive multiple commands to access data in one of memory components 112A to 112N, for example, the arbiter component 113 arbitrates and provides the request to media controller 620 which retrieves and returns the requested data, writes the requested data or erases the requested data from the memory components 112A to 112N.

In one embodiment, controller 115 further includes quality of service (QoS) module 622 and sideband management (SM) bus 624. QoS can implement individual quality of service management for each of the queues 202-208 of the multiple PFs. When a large storage device, such as one of memory components 112A to 112N is sliced into smaller partitions, each controlled by PF, and that can each be used by different clients (e.g., virtual machines on host system 120), it may be beneficial to associate QoS characteristics with each individual partition. To meet these requirements, QoS module 622 attaches QoS controls to each PF. The QoS controls may include, for example, an individual storage partition size, bandwidth, or other characteristics. QoS module 622 may monitor the performance of queues 202-208 over time and may reconfigure resource assignments as needed to ensure compliance with the QoS requirements.

SM bus 624 communicates with a platform manager (not shown), such as a baseboard management controller (BMC) in memory sub-system 110 to interface with platform hardware. The platform manager may interface with different types of sensors built into memory sub-system 110 to report on parameters, such as temperature, cooling fan speeds, power status, operating system status, etc. The platform manager monitors these sensors and can generate alerts if any of the parameters do not stay within certain pre-set limits, indicating a potential failure. Controller 115 may receive these alerts from the platform manager and/or provide status information to platform manager via SM bus 624.

Figure 7:
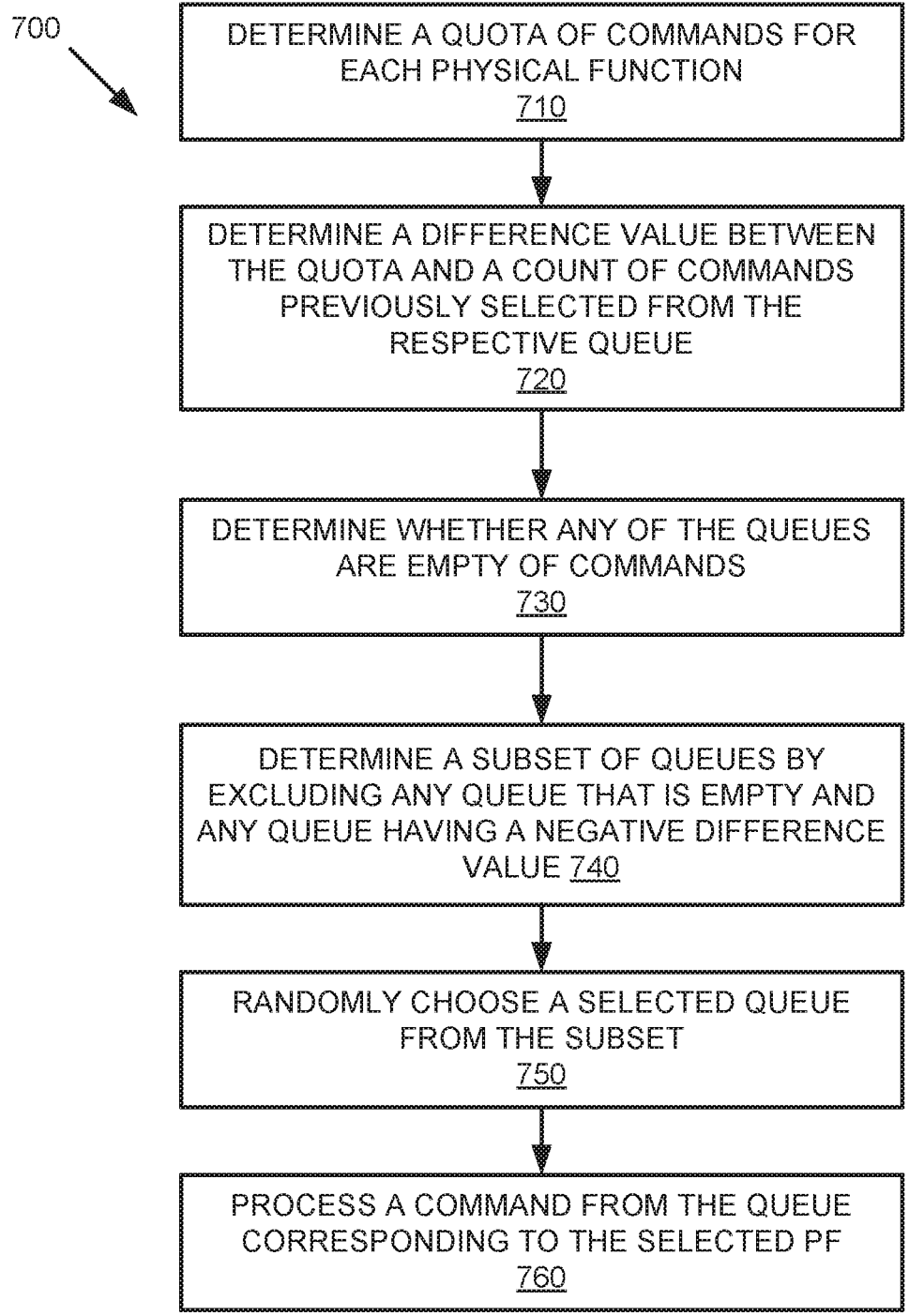
FIG. 7 is a flow diagram of another example method to arbitrate commands from multiple queues associated with multiple physical functions in a memory sub-system in accordance with some embodiments of the present disclosure.

FIG. 7 is a flow diagram of an example method 700 to arbitrate commands from multiple queues associated with multiple physical functions in a memory sub-system in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the arbiter component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, the processing device determines a quota of commands for each PF presented to a host computing system over an interconnect between a host computing system and the system controller. Each of the multiple PFs includes a queue to store commands from the host computing system. At operation 720, the processing logic determines a difference value between the quota of commands and a count of commands previously selected from the respective queue for each of the multiple PFs. At operation 730, the processing logic determines whether any of the multiple queues is empty of commands. At operation 740, the processing logic determines a subset of queues from the multiple queues by excluding any queue that is empty of commands and any queue having a negative number for the respective difference value (also referred to herein as negative difference value). At operation 750, the processing logic randomly chooses a selected queue from the subset. At operation 760, the processing logic processes a command from the queue corresponding to the selected PF.

In a further embodiment, the processing logic stores a number of available command slots in a timing window. The processing logic can receive specified shares for each of the multiple PFs from the host computing system. The processing logic can determine the quota of commands for each of the multiple PFs comprises determining the quota of commands based on the respective specified share and the number of available command slots.

In a further embodiment, the processing logic randomly choosing the selected queue by: calculating a sum of the difference value of each of the queues in the subset; assigning a proportional number of index values to each of the queues in the subset based on a ratio of the respective difference value and the sum; and randomly selecting an index value between one and the sum to select the selected queue from the subset.

In a further embodiment, the processing logic can determine that the subset of queues is empty after excluding queues that are empty of commands and queues having the negative number for the respective difference value. As such, the processing logic can determine the subset of queues from the multiple queues by excluding only queues that are empty of commands. That is, the subset of queues can include PFs with negative difference values.

Figure 8:
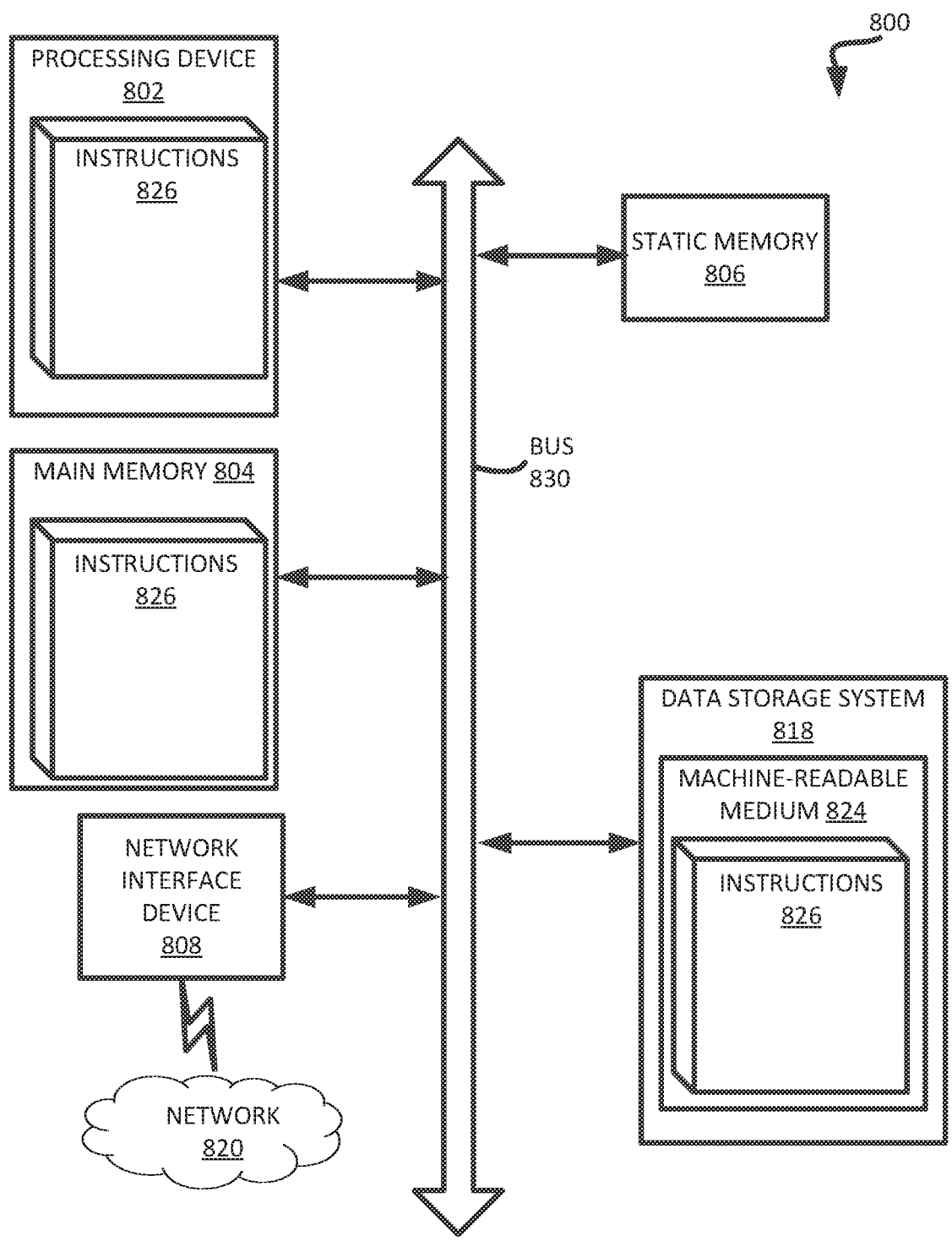
FIG. 8 is a block diagram of an example computer system in which embodiments of the present disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the arbiter component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to a caching component (e.g., the arbiter component 113 of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory system comprising:
one or more memory devices;
a peripheral component interconnect express (PCIe) interface;
a plurality of queues, each queue of the plurality of queues being associated with a physical function (PF) of a plurality of PFs presented to a host computing system over the PCIe interface; and
an arbiter circuit coupled to the plurality of queues, wherein the arbiter circuit is to:
for each of the plurality of PFs, determine a difference value between a quota of commands and a count of commands issued from a respective queue, wherein the quota of commands is based on a share for a respective PF, the share being specified by the host computing system;
for each of the plurality of PFs, determine whether the respective queue is empty of commands;
determine a subset of queues from the plurality of queues by excluding queues that are empty of commands and queues having a negative number for a respective difference value;
randomly choose a selected queue from the subset of queues, wherein the arbiter circuit is to:
calculate a sum of the difference value of each of the queues in the subset;
assign a proportional number of index values to each of the queues in the subset based on a ratio of the respective difference value and the sum; and
randomly select an index value between one and the value of the sum, the index value specifying a selection of the selected queue from the subset; and
issue a command from the selected queue.

2. The memory system of claim 1, wherein the arbiter circuit is further to:
store a number of available command slots in a timing window; and
for each of the plurality of PFs, determine the respective quota of commands based on the respective share specified by the host computing system and the number of available command slots.

3. The memory system of claim 1, wherein the arbiter circuit further comprises a plurality of counters, each counter being associated with one of the plurality of queues, wherein the arbiter circuit is further to track the count of commands issued from the respective queue by incrementing the respective counter when a command is issued from the respective queue.

4. The memory system of claim 1, wherein the arbiter circuit comprises a plurality of sub-counters for each of the plurality of queues, wherein a number of the plurality of sub-counters corresponds to a number of sub-windows in a timing window having a number of available command slots.

5. The memory system of claim 1, wherein the arbiter circuit, to randomly choose the selected queue from the subset, is to use a weighted round-robin selection process.

6. The memory system of claim 1, wherein the arbiter circuit is further to:
after excluding queues that are empty of commands and queues having the negative number for the respective difference value, determine that there are no remaining queues in the subset of queues; and
determine a second subset of queues from the plurality of queues by excluding only queues that are empty of commands and including queues having the negative number for the respective difference value.

7. An apparatus comprising:
an interface; and
a processing device coupled to the interface, wherein the processing device is to:
present a plurality of physical functions (PFs) to a host computing system over the interface, wherein each of the plurality of PFs being associated with a queue to store commands from the host computing system;
for each of the plurality of PFs, determine a difference value between a current count of commands issued from a respective queue and a quota of commands specified by the host computing system;
generate a subset of candidate PFs for selection of a command from a respective queue by removing any of the PFs where a respective queue does not store a command from the host computing system and removing any of the PFs where the difference value is less than zero;
randomly choose a selected PF from the subset of candidate PFs by calculating a sum of the difference value of each of the subset of candidate PFs, assigning a proportional number of index values to each of the subset of candidate PFs based on a ratio of a respective difference value and the sum, and randomly selecting an index value between one and the value of the sum, the index value specifying a selection of the selected PF; and
process a command from the queue corresponding to the selected PF.

8. The apparatus of claim 7, wherein the system controller is to determine the quota of commands using a respective share percentage for a respective PF, the share being specified by the host computing system, wherein the system controller is further to receive the share percentage from the host computing system for each of the plurality of PFs.

9. The apparatus of claim 7, wherein the system controller is further to receive control information from the host computing system using one of the plurality of PFs.

10. The apparatus of claim 7, wherein the processing device comprises:
a plurality of queues, each queue of the plurality of queues being associated with one of the plurality of PFs; and
an arbiter circuit coupled to the plurality of queues, wherein the arbiter circuit, for each of the plurality of PFs, is to:
determine the quota of commands based on a respective share percentage for a respective PF, the respective share percentage being specified by the host computing system,
track the current count of commands issued from the respective queue, and
determine the difference value between the quota and the current count.

11. The apparatus of claim 10, wherein the arbiter is further to:
generate the subset of candidate PFs;
randomly choose the selected PF from the subset of candidate PFs; and
issue the command from the queue, corresponding to the selected PF, to a media controller.

12. The apparatus of claim 10, wherein the arbiter is further to:
store a number of available command slots in a timing window; and for each of the plurality of PFs, determine a respective quota of commands based on the respective share percentage specified by the host computing system and the number of available command slots.

13. The apparatus of claim 10, wherein the arbiter circuit further comprises a plurality of counters, each counter being associated with one of the plurality of queues, wherein the arbiter circuit is further to track the count of commands issued from the respective queue by incrementing a respective counter when a command is issued from the respective queue.

14. The apparatus of claim 10, wherein the arbiter circuit comprises a plurality of sub-counters for each of the plurality of queues, wherein a number of the plurality of sub-counters corresponds to a number of sub-windows in a timing window having a number of available command slots.

15. A method comprising:
determining, by a system controller of a memory system, a quota of commands for each of a plurality of physical functions (PFs) presented to a host computing system over an interconnect between the host computing system and the system controller, wherein each of the plurality of PFs comprises a queue to store commands from the host computing system;
determining, by the system controller, a difference value between the quota of commands and a count of commands previously selected from a respective queue for each of the plurality of PFs;
determining, by the system controller, whether any of the queues is empty of commands;
determining, by the system controller, a subset of queues by excluding any queue that is empty of commands and any queue having a negative number for a respective difference value;
randomly choosing, by the system controller, a selected queue from the subset by:
calculating a sum of the difference value of each of the queues in the subset;
assigning a proportional number of index values to each of the queues in the subset based on a ratio of a respective difference value and the sum; and
randomly selecting an index value between one and the sum, the index value specifying a selection of the selected queue from the subset; and
processing, by the system controller, a command from the queue corresponding to a selected PF.

16. The method of claim 15, further comprising:
storing a number of available command slots in a timing window; and
receiving specified shares for each of the plurality of PFs from the host computing system, wherein the determining the quota of commands for each of the plurality of PFs comprises determining the quota of commands based on a respective specified share and the number of available command slots.

17. The method of claim 15, further comprising:
after excluding queues that are empty of commands and queues having the negative number for the respective difference value, determining that there are no remaining queues in the subset of queues; and
determining a second subset of queues by excluding only queues that are empty of commands and including queues having the negative number for the respective difference value.

* * * * *